US012579171B2

(12) United States Patent
Qorbani

(10) Patent No.: US 12,579,171 B2
(45) Date of Patent: Mar. 17, 2026

(54) SYSTEMS AND METHODS FOR A UNIFIED MATCHING ENGINE

(71) Applicant: Adstra, Inc., Princeton, NJ (US)

(72) Inventor: Reza Qorbani, Laguna Niguel, CA (US)

(73) Assignee: Adstra, Inc., Princeton, NJ (US)

( * ) Notice: Subject to any disclaimer, the term of this patent is extended or adjusted under 35 U.S.C. 154(b) by 0 days.

(21) Appl. No.: 17/742,522

(22) Filed: May 12, 2022

(65) Prior Publication Data

US 2022/0405309 A1 Dec. 22, 2022

Related U.S. Application Data

(60) Provisional application No. 63/208,919, filed on Jun. 9, 2021.

(51) Int. Cl.
*G06F 16/28* (2019.01)
*G06F 16/901* (2019.01)
(Continued)

(52) U.S. Cl.
CPC ........ *G06F 16/288* (2019.01); *G06F 16/9024* (2019.01); *G06F 21/6218* (2013.01); *G06N 5/025* (2013.01); *G06N 20/00* (2019.01)

(58) Field of Classification Search
CPC ............... G06Q 50/01; G06Q 30/0241; G06Q 30/0269; G06Q 30/0201; G06Q 30/0277;
(Continued)

(56) References Cited

U.S. PATENT DOCUMENTS 8,185,558 B1 * 5/2012 Narayanan .......... G06F 3/04842
707/798
8,311,950 B1 * 11/2012 Kunal ................... H04L 67/535
705/319
(Continued)

FOREIGN PATENT DOCUMENTS

| CN | 102385625 B | * | 9/2015 | ........... G06F 16/288 |
| CN | 113688190 A | * | 11/2021 | |
| CN | 111813873 B | * | 9/2023 | ........... G06F 16/288 |

OTHER PUBLICATIONS

J. Mugan et al., "Entity resolution using inferred relationships and behavior," 2014 IEEE International Conference on Big Data (Big Data), Washington, DC, USA, 2014, pp. 555-560, doi: 10.1109/BigData.2014.7004273. (Year: 2014).*

*Primary Examiner* — Dennis Truong
(74) *Attorney, Agent, or Firm* — Faegre Drinker Biddle & Reath LLP

(57) ABSTRACT

A computer-implemented method for implementing a uniform matching engine. In aspects, the method includes receiving consumer data from a plurality of data sources, the consumer data include a plurality of attributes that include personally identified information, non-personally identifiable information, or a combination thereof. In some aspects, the method associates a first attribute of the plurality of attributes with a second attribute of the plurality of attributes and creates combinations of attributes based upon the associations. In some aspects, the method includes matching first and second combinations of the multiple combinations and associating one or more attributes included in the first combination with one or more attributes included in the second combination based upon the matching. In addition, the method includes outputting the association of the one or more attributes included in the first combination with the one or more attributes included in the second combination.

16 Claims, 9 Drawing Sheets

(51) Int. Cl.

| | | |
|---|---|---|
| *G06F 21/62* | (2013.01) | |
| *G06N 5/025* | (2023.01) | |
| *G06N 20/00* | (2019.01) | |
| *G06Q 30/0201* | (2023.01) | |

(58) Field of Classification Search

CPC .......... G06Q 30/0255; G06Q 30/0261; G06Q 30/0251; G06Q 20/384; G06Q 30/0643; G06Q 30/0205; G06Q 30/01; G06F 16/9024; G06F 16/285; G06F 16/35; G06F 16/288; G06F 16/906; G06F 16/55; G06F 21/6218; G06N 5/025; G06N 20/00

See application file for complete search history.

(56) References Cited

U.S. PATENT DOCUMENTS

| | | | | |
|---|---|---|---|---|
| 8,606,721 | B1 * | 12/2013 | Dicker | ................... G06Q 10/10 705/319 |
| 8,736,612 | B1 * | 5/2014 | Goldman | ........... G06F 16/9024 345/440 |
| 9,514,248 | B1 * | 12/2016 | Guan | ........................ H04L 9/40 |
| 10,262,001 | B2 * | 4/2019 | Faith | ..................... G06F 16/164 |
| 10,728,350 | B1 * | 7/2020 | Khanwalkar | ........... H04L 67/02 |
| 11,379,754 | B2 * | 7/2022 | Thomas | ................ G06F 16/215 |
| 2003/0018652 | A1 * | 1/2003 | Heckerman | ........ G06Q 30/0641 |
| 2010/0262477 | A1 * | 10/2010 | Hillerbrand | ........... G06F 16/245 707/706 |
| 2012/0166371 | A1 * | 6/2012 | Sweeney | .................. G06N 7/01 706/14 |
| 2012/0324027 | A1 * | 12/2012 | Vaynblat | ........... G06Q 30/0271 709/204 |
| 2014/0297740 | A1 * | 10/2014 | Narayanan | ............. G06Q 10/10 709/204 |
| 2015/0113060 | A1 * | 4/2015 | Wahi | ...................... G06Q 10/10 709/204 |
| 2016/0171535 | A1 * | 6/2016 | Linden | ............... G06Q 30/0269 705/14.53 |
| 2016/0188713 | A1 * | 6/2016 | Green | ................. G06F 16/9535 707/738 |
| 2016/0260129 | A1 * | 9/2016 | Fadeev | .............. G06Q 30/0255 |
| 2017/0206276 | A1 * | 7/2017 | Gill | ....................... G06F 16/285 |
| 2017/0235846 | A1 * | 8/2017 | Atlas | ..................... H04L 67/535 |
| 2018/0150572 | A1 * | 5/2018 | Yates | ..................... G06Q 50/01 |
| 2018/0213033 | A1 * | 7/2018 | Subbian | ................ H04L 67/306 |
| 2018/0247337 | A1 * | 8/2018 | Gourley | ................. G06F 16/35 |
| 2019/0089711 | A1 * | 3/2019 | Faulkner | ............ H04L 63/1433 |
| 2019/0138653 | A1 * | 5/2019 | Roller | ..................... G06F 40/35 |
| 2020/0042505 | A1 * | 2/2020 | Sweeney | .................. G06N 7/01 |
| 2020/0175038 | A1 * | 6/2020 | Guan | ..................... G06F 16/284 |
| 2020/0193151 | A1 * | 6/2020 | Wnuk | .................. G06F 16/2228 |
| 2021/0019325 | A1 * | 1/2021 | Edge | .................... G06F 16/254 |
| 2021/0019839 | A1 * | 1/2021 | Su | ........................ G06F 16/9536 |
| 2021/0311952 | A1 * | 10/2021 | Jain | ........................ G06N 20/00 |
| 2022/0086162 | A1 * | 3/2022 | Badawy | .................. H04L 63/20 |
| 2022/0101161 | A1 * | 3/2022 | Goel | ...................... G06N 20/00 |

* cited by examiner

100

104A

104B

104C

112A

112B

114

106

102A

102B

110

Network
108

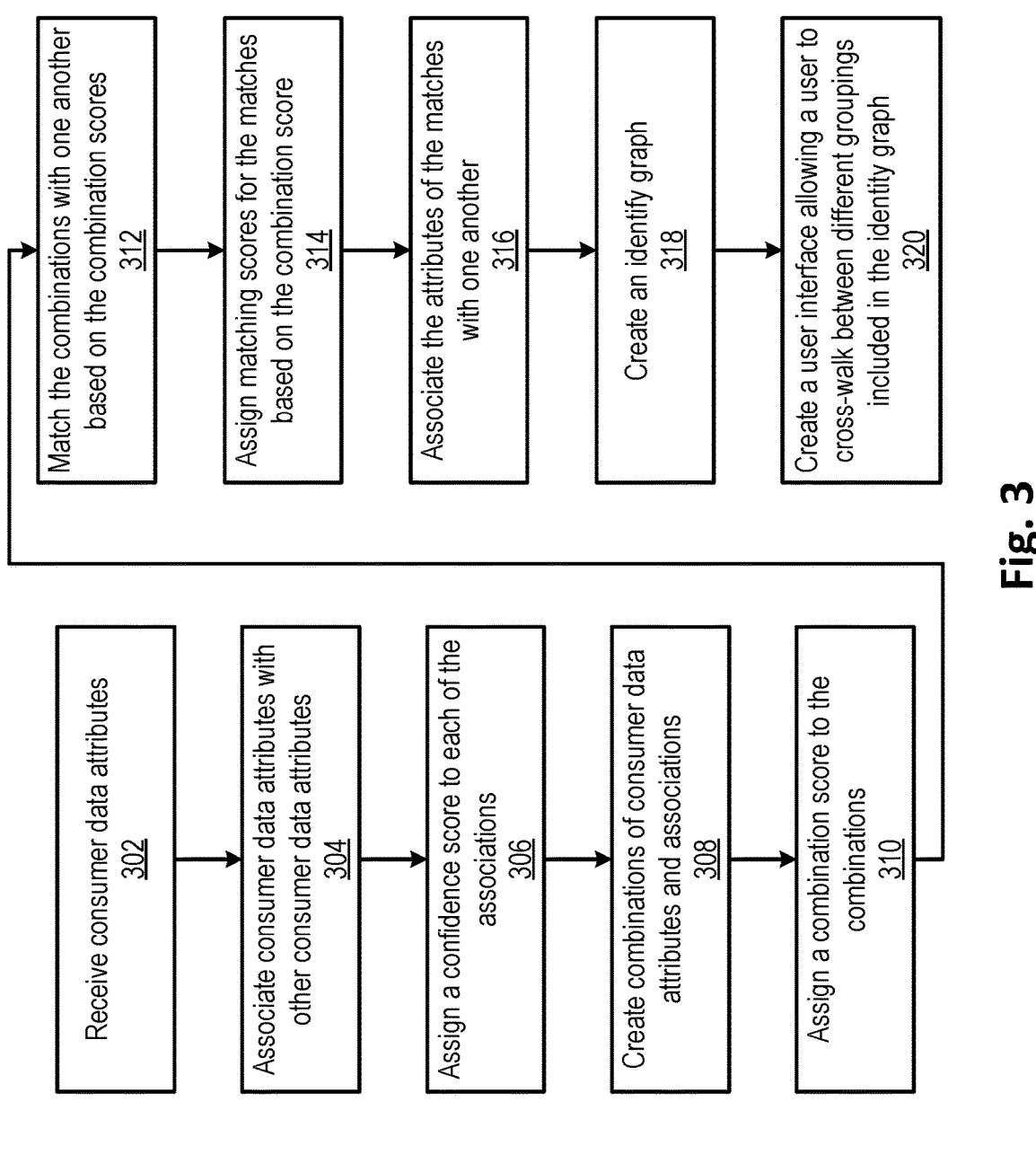

Match the combinations with one another based on the combination scores 312

Assign matching scores for the matches based on the combination score 314

Associate the attributes of the matches with one another 316

Create an identify graph 318

Create a user interface allowing a user to cross-walk between different groupings included in the identity graph 320

Receive consumer data attributes 302

Associate consumer data attributes with other consumer data attributes 304

Assign a confidence score to each of the associations 306

Create combinations of consumer data attributes and associations 308

Assign a combination score to the combinations 310

SYSTEMS AND METHODS FOR A UNIFIED MATCHING ENGINE

RELATED APPLICATION

This application is related to and claims priority from U.S. Provisional Application 63/208,919 filed Jun. 9, 2021, titled "Systems and Methods for a Unified Matching Engine," the disclosure of which is incorporated herein by reference in its entirety.

FIELD OF THE INVENTION

A computer-implemented method for implementing a uniform matching engine is disclosed.

BACKGROUND

Digital marketers provide targeted advertising to a consumer by constructing a profile of a consumer based upon various consumer interactions. However, planned changes in the ability of a marketer to adequately track a consumer's interactions may reduce the likelihood of a marketer to adequately construct a profile for a consumer.

SUMMARY

Marketers need a new identity-matching method to unify their customer-relationship management (CRM) efforts across devices and channels, to help them deliver the personalized experiences proven to drive loyalty, purchases, and long-term revenue. In addition, decisions to phase out third-party cookies is problematic for the advertising and marketing ecosystem, and further highlights the need for durable alternatives to facilitate relationships between brands and consumers. Embodiments disclosed herein provide solutions to these problems by disclosing a unified matching engine that analyzes information pertaining to a particular consumer across various databases but is not necessarily attributed to that particular consumer in order to cross-correlate that information with other attributes and/or information and/or to attribute the information to a particular consumer.

In an Example 1, computer-implemented method for implementing a uniform matching engine, comprises: receiving consumer data from a plurality of data sources, the consumer data comprising a plurality of attributes that include personally identified information, non-personally identifiable information, or a combination thereof; associating a first attribute of the plurality of attributes with a second attribute of the plurality of attributes; creating a plurality of combinations of attributes of the plurality of attributes based upon the associations; matching a first combination of the plurality of combinations to a second combination of the plurality of combinations; associating one or more attributes included in the first combination with one or more attributes included in the second combination based upon the matching; and outputting the association of the one or more attributes included in the first combination with the one or more attributes included in the second combination.

In an Example 2, the method of Example 1, further comprising assigning a matching score to the match of the first combination and the second combination.

In an Example 3, the method of Example 1, wherein the plurality of data sources comprise at least one data source selected from the following data sources: public records, public censuses, property data, realty data, telecom data, purchase propensity data, content publisher data, e-commerce data, supply-side publisher data, mobile application data, customers data sets, clickstream data, and/or digital metadata.

In an Example 4, the method of Example 1, further comprising generating an identity graph based at least in part upon (i) the association of the first attribute with the second attribute, (ii) the plurality of combinations, (iii) the matching of the first combination to the second combination, (iv) the association of the one or more attributes included in the first combination with the one or more attributes included in the second combination, or a combination thereof.

In an Example 5, a computer-implemented method for implementing a uniform matching engine, comprises: receiving an association of a first attribute of the plurality of attributes with a second attribute of the plurality of attributes, wherein the plurality of attributes comprise personally identified information, non-personally identifiable information, or a combination thereof; receiving an association of one or more attributes included in a first combination of a plurality of combinations with one or more attributes included in the second combination of a plurality of combinations of attributes, wherein the plurality of combinations combine at least a portion of the plurality of attributes into different combinations; generating an identity graph based at least in part upon (i) the association of the first attribute with the second attribute, (ii) the plurality of combinations, or a combination thereof; and outputting the identity graph.

In certain embodiments the selection of the first attribute and the second attribute for use in the identify graph are based on at least one of (i) a hierarchical structure, (ii) a relationship between the first attribute and the second attribute, (iii) a physical geographical address, and (iv) a common digital device.

The plurality of data sources may include data from digital device interactions, including data regarding digital identity data, device identifiers, attribute data, browser and app-level data, location data, and/or online behavioral data. The digital device interaction data may be obtained from one or more of the following: (i) content & e-commerce publishers, (ii) supply-side platform aggregators, (iii) mobile application SDKs or aggregators, (iv) customer provided data, (v) clickstream data aggregators, and (vi) device metadata.

The data sources may include data from one or more digital device interactions, and where the associating of a first attribute of the plurality of attributes with a second attribute of the plurality of attributes involves determining if the first attribute and the second attribute were obtained from data from the same digital device interactions and, if so, associating the first attribute and the second attribute.

In embodiments, a confidence score is assigned to the association of the first attribute and the second attribute based on one or more of: (i) how frequently the first attribute and the second attribute have been included in the same digital device interaction, where the more frequent the inclusion the greater the confidence score; (ii) how recently the first attribute and the second attribute have been included in the same digital device interaction, where the more recent the inclusion the greater the confidence score; (iii) whether the first attribute and the second attribute are of a particular type; and (iv) the association of the first attribute and the second attribute each with other attributes.

The assigning a combination score to each of the combinations of the plurality of combinations may be based on one or more of: (i) how frequently the combination of attributes have been included in the same digital device interaction, where the more frequent the inclusion the greater the combination score; (ii) how recently the combination of attributes have been included in the same digital device interaction, where the more recent the inclusion the greater the confidence score; (iii) whether the combination of attributes are of a particular type; and (iv) a set of rules selected based at least one of the attributes.

In certain aspects, a first combination score for a first combination of attributes is adjusted using a machine learning algorithm. The machine learning algorithm may use feature engineering and model generation to determine combination scores associated with different combinations of attributes.

In certain aspects, a first combination score for a first combination of attributes is adjusted by (i) removing an attribute from the first combination of attributes to form a subcombination, (ii) calculating a combination score for the subcombination, and (iii) adjusting the combination score for the subcombination based on the first combination score.

The matching of the first combination of the plurality of combinations to the second combination of the plurality of combinations is based at least in part on the combination scores.

Other examples include any of the one or more above aspects described above in combination with any other of the one or more aspects described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following figures.

FIG. 3 illustrates a flow diagram of a method for performing unified matching, in accordance with certain aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As stated above, the reduction and/or elimination of the third-party cookies has accelerated the need for new identity paradigms, but the rush to find a replacement for the cookie is taking place against the backdrop of broader struggles with the slow pace of innovation in the management and portability of data. A fragmented marketplace offers only fractional solutions, based in either online or offline data sets, capable in either known or anonymous realms, but without the range, fluency, and extensibility to support omnichannel efforts inclusive of both. Embodiments disclosed herein provide a solution to this problem using techniques necessarily rooted in computer technology, i.e., by analyzing big data sets to create at least hundreds of combinations of attributes. Further, the embodiments disclosed herein increase the matching rate of the combinations. For a brand that has tens of millions of records in its customer resource management (CRM) file, an increased matching rate, multiplied by the calculated lifetime value of their customers, could mean significant incremental revenue, thereby providing a practical application over conventional embodiments.

Figure 1:
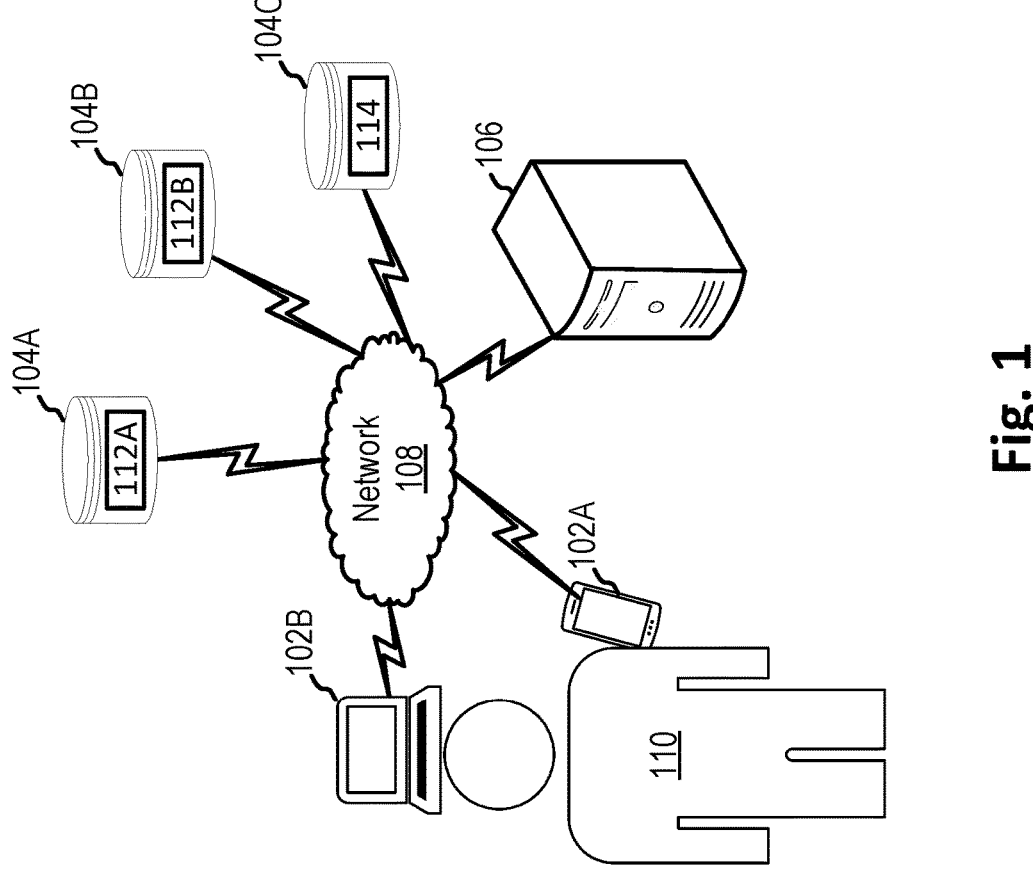
FIG. 1 illustrates an overview of an example system for a unified matching engine, in accordance with certain aspects of the present disclosure.

FIG. 1 illustrates an overview of an example system 100 for a unified matching engine, in accordance with certain aspects of the present disclosure. This diagram is merely an example, which should not unduly limit the scope of the claims. One of ordinary skill in the art would recognize many variations, alternatives, and modifications are possible in light of the present disclosure.

As illustrated, the system 100 includes one or more user electronic devices 102, one or more databases 104, and one or more unified matching engine servers 106, which are coupled together via a network 108. The network 108 may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The network 108 may include a combination of multiple networks.

According to certain embodiments, the one or more user electronic devices 102 are used by one or more consumers 110 to engage in various interactions, such as visit webpages, send and receive email using a variety of email services, use various computer and/or mobile applications (e.g., news applications, productivity applications (e.g., MS Word™, MS Excel™, etc.), health applications, social media applications), stream music and/or video content from one or more streaming services (e.g., Hulu™, Netflix™, Disney™, YouTube™, Spotify™, Apple Music™, etc.), and/or the like. Interactions between a consumer 110 and a user electronic device 102 may be referred to herein as digital device interactions. Examples of electronic devices 102 include, but are not limited to, smart end user devices (e.g., phones, watches, etc.), computers, televisions, set-top boxes, and/or the like.

According to certain embodiments, digital device interactions and data related to these digital interactions can be stored in a database 104. In certain instances, digital device interactions with a particular company's website or application will be saved to a first company's database 104A as digital device interaction data 112A and digital device interactions with another website or computer application will be saved to a second company's database 104B as digital device interaction data 112B. For example, digital device interaction data 112A related to the content a consumer 110 watches on Netflix™ streaming service may be stored on a Netflix™ database 104A and digital device interaction data 112B related to the content the consumer 110 watches on Hulu™ streaming service may be stored on a Hulu™ database 104B. Additionally, or alternatively, each digital device interaction data 112 may be attributed to a content category. For example, a consumer's 110 digital device interaction data 112 pertaining to streaming video content may be attributed to a video streaming content category and the consumer's digital device interaction data 112 pertaining to the consumer's 110 social media accounts may be attributed to a social medial content category. Additionally, or alternatively, different companies may store the digital device interaction data 112 in various different formats. Moreover, different companies that provide similar (or dissimilar) services, e.g., provide video content for streaming, such as Netflix™ and Hulu™ streaming services, may determine different digital device interaction data 112 as being pertinent and/or store different digital device interaction data 112 based on the consumer's 110 use of that service.

To complicate matters even further, the digital device interaction data 112 related to digital device interactions oftentimes does not included personally identifiable information so the digital device interaction data 112 related to the digital device interactions cannot be attributed to a particular consumer 110. Personally identifiable information (PII) as used herein includes (1) any information that can be used to distinguish or trace an individual's identity, such as, but not limited to, name, social security number, date and place of birth, mother's maiden name, or biometric records; and (2) any other information that is linked or linkable to an individual, such as medical, educational, financial, and employment information. Information and/or data that cannot be used to identify an individual is referred to herein as non-PII.

Examples of digital device interaction data 112 include, but are not limited to, digital identity data, device identifiers, attribute data, browser and app-level data, location data, and/or online behavioral data. Some examples of device identifiers include HTTP header information. Examples of HTTP header information include, but are not limited to, X-Device-User-Agent information, X-Device-IP information, X-Device-Referer information, X-Device-Accept-Language information, X-Forwarded-For (XFF) information, and Forwarded HTTP Extension information. Other examples of digital device interaction data 112 include, but are not limited to, the following:

Content & E-Com Publishers—Device and browser-level data along with email hashes or other authentication identifiers SSPs/Publisher aggregators—Device and browser-level data along with email hashes or other authentication identifiers Mobile App SDKs/aggregators—Device-level identifiers and data like location, intent attributes, etc.

Customers (provisioned data)—Device and browser-level data along with email hashes or other authentication identifiers Clickstream—Device and browser-level data along with email hashes or other authentication identifiers Device and other digital metadata—Device metadata like make, model, carrier, IP metadata like geo-lookup, POI interest metadata Additionally, or alternatively, the consumer 110 also has non-digital device interactions, which may or may not include PII. According to certain embodiments, non-digital device interaction data 114 pertaining to non-digital device interactions may be stored in even another database 104C.

Examples of non-digital device interaction data 114 include, but are not limited to, terrestrial identity data. Some specific examples of non-digital device interaction data 114 include, but are not limited to, the following:

Public Record/Census—Used in terrestrial identity (Name and Address type information)

Property/Realty—Address verification and/or attribute data like home value, etc.

Telecom—Name and Address type information along with other attributes

Purchase propensity—Name, Address, Email and Phone type information along with Intent attributes As described above, it is important for advertisers to understand a consumer's 110 behavior in order to provide better, more targeted advertising services to the consumer 110. However, decisions to phase out third-party cookies will make it difficult to correlate a consumer's 110 digital device interaction data 112 across different databases 104. Furthermore, traditional methods have either not attempted to correlate a consumer's 110 digital device interaction data 112 with non-digital device interaction data 114 or have been ineffective in doing so. Furthermore, traditional methods have not been very successful in matching non-digital device interaction data 114 with other non-digital device interaction data 114. In addition, traditional methods frequently utilize incorrect, questionable or erroneous PII data and non-PII data assuming such data to be accurate. Embodiments disclosed herein provide a solution to this problem by disclosing a unified matching engine that transcends the digital device interaction data 112 and non-digital device interaction data 114. In certain instances, the uniform matching engine can be implemented on one or more servers 106.

Figure 2:
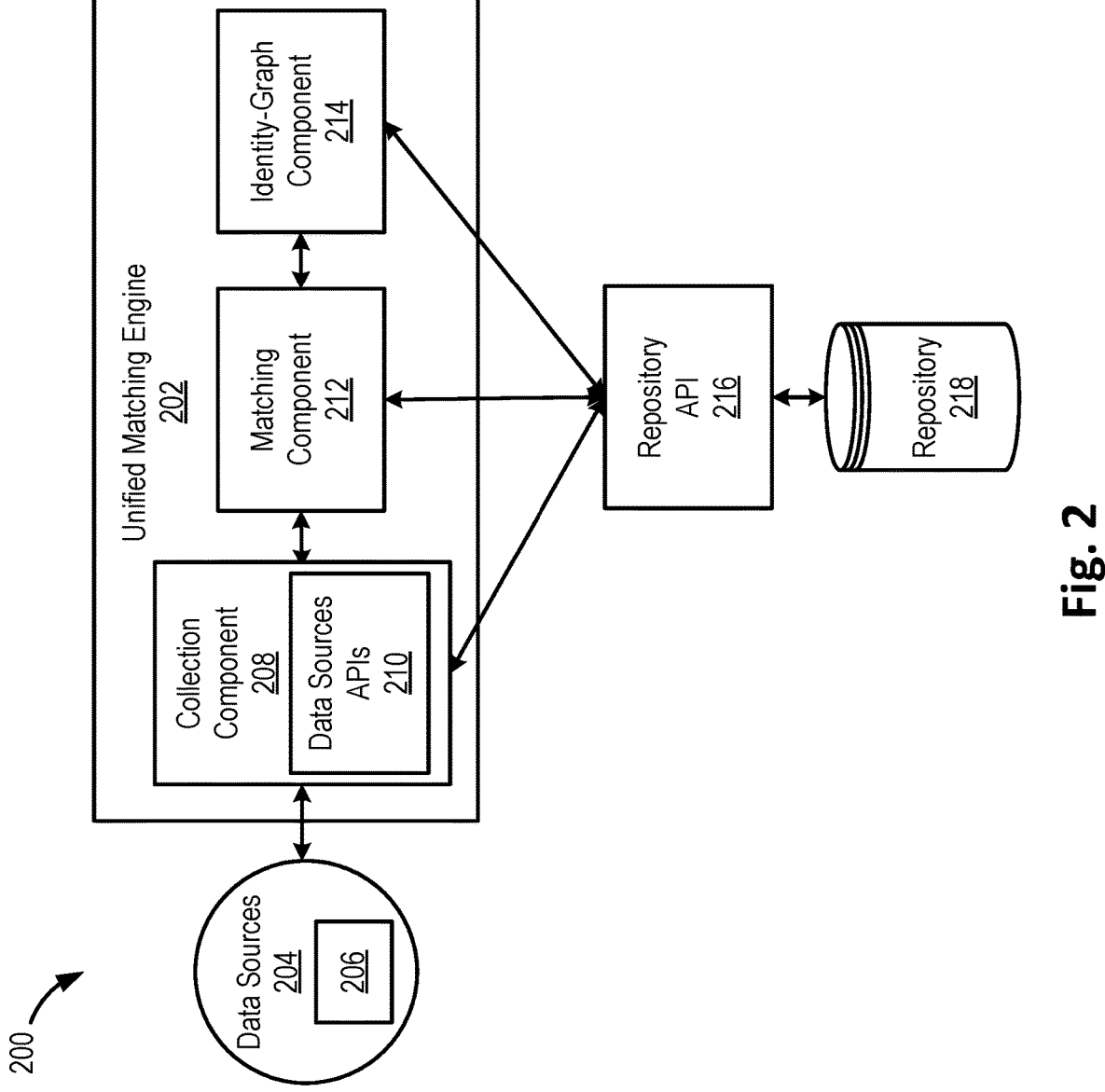
FIG. 2 illustrates a block diagram including components of a unified matching engine server, in accordance with certain aspects of the present disclosure.

FIG. 2 illustrates a block diagram 200 including components of a unified matching engine server, in accordance with certain aspects of the present disclosure. This diagram is merely an example, which should not unduly limit the scope of the claims. One of ordinary skill in the art would recognize many variations, alternatives, and modifications.

In certain embodiments, the unified matching engine 202 receives data from a plurality of data sources 204. The data sources 204 can include digital device interaction data (e.g., the digital device interaction data 112) and non-digital device interaction data (e.g., the non-digital device interaction data 114), which are collectively referred to herein as consumer data attributes 206.

As set forth above, examples of digital device interaction data include, but are not limited to, digital identity data, device identifiers, attribute data, browser and app-level data, location data, and/or online behavioral data. Some examples of device identifiers include HTTP header information. Examples of HTTP header information include, but are not limited to, X-Device-User-Agent information, X-Device-IP information, X-Device-Referer information, X-Device-Accept-Language information, X-Forwarded-For (XFF) information, and Forwarded HTTP Extension information. Other examples of digital device interaction data 112 include, but are not limited to, the following:

Content & E-Com Publishers—Device and browser-level data along with email hashes or other authentication identifiers SSPs/Publisher aggregators—Device and browser-level data along with email hashes or other authentication identifiers Mobile App SDKs/aggregators—Device-level identifiers and data like location, intent attributes, etc.

Customers (provisioned data)—Device and browser-level data along with email hashes or other authentication identifiers Clickstream—Device and browser-level data along with email hashes or other authentication identifiers Device and other digital metadata—Device metadata like make, model, carrier, IP metadata like geo-lookup, POI interest metadata And, examples of non-digital device interaction data include, but are not limited to, terrestrial identity data. Some specific examples of non-digital device interaction data 114 include, but are not limited to, the following:

Public Record/Census—Used in terrestrial identity (Name and Address type information)

Property/Realty—Address verification and/or attribute data like home value, etc.

Telecom—Name and Address type information along with other attributes

Purchase propensity—Name, Address, Email and Phone type information along with Intent attributes According to certain embodiments, the unified matching engine 202 includes a collection component 208 that is configured to receive and/or retrieve the consumer data attributes 206 from the data sources 204. In some examples, the API 210 provides a user interface that allows users to interact with data received and/or retrieved by the collection component 208.

Once the collection component 208 receives and/or retrieves the consumer data attributes 206 from the data sources 204, the collection component 208 can pass the consumer data attributes 206 to the matching component 212, which can then match the consumer data attributes 206 saved across different platforms and databases (e.g., databases 104) so a marketer can have a more complete picture of a consumer's tendencies. For example, the matching component 212 can match: (i) non-PII of a consumer (e.g., consumer 110) to other non-PII of the consumer, (ii) non-PII of the consumer to PII of the consumer, and/or (iii) PII of the consumer to other PII of the consumer. Additionally, or alternatively, the matches determined by the matching component 212 can be passed to the identity-graph component 214 to create an identity graph based upon the matches, which is explained in more detail below.

According to certain embodiments, the matching component 212 is configured to perform the method 300 illustrated in FIG. 3. This diagram is merely an example, which should not unduly limit the scope of the claims. One of ordinary skill in the art would recognize many variations, alternatives, and modifications.

As illustrated, the method 300 includes receiving consumer data attributes 206 (block 302). In certain instances, the matching component 212 receives the consumer data attributes 206 from the collection component 208 and/or directly from the data sources 204.

In certain instances, the method 300 includes associating consumer data attributes with other consumer data attributes (block 304). For example, the method 300 can include associating digital device interaction data 112A stored in database 104A with digital device interaction data 112B stored in database 104B and/or with non-digital device interaction data 114 stored in database 104C.

In certain instances, a first consumer data attribute is associated with a second consumer data attribute if they have been included in the same digital device interaction and/or non-digital device interaction. For example, if an IP address has been associated with specific streaming content, then the matching component 212 associates the IP address with the specific streaming content. As another example, if a person's name has been associated with the specific streaming content, then the matching component 212 associates the person's name with the specific streaming content. Further, even if the person's name has not been associated with the IP address, then the matching component 212 may associate the person's name with the IP address because both the person's name and the IP address are associated with the specific streaming content. In certain instances, the matching component 212 makes these associations for at least a portion of the consumer data attributes 206. This can lead to hundreds or thousands of different associations for even a single consumer.

In certain embodiments, the method 300 further includes assigning a confidence score to each of the associations (block 306). In some examples, the confidence score may range from 0 to 1. In certain examples, the confidence score assigned to an association is based on the frequency and/or time that a first consumer data attribute has been included in the same digital device interaction and/or non-digital device interaction as a second consumer data attribute. In certain embodiments, the more frequent an association between two consumer data attributes, the higher the confidence score, and the more recent association between two consumer data attributes, the higher the confidence score.

For example, if a first consumer data attribute has been included in the same digital device interaction and/or non-digital device interaction as a second consumer data attribute N number of times and the first consumer data attribute has been included in the same digital device interaction and/or non-digital device interaction as a third consumer data attribute M number of times, where $N > M$, then the association between the first consumer data attribute 206 and the second consumer data attribute will have a higher confidence score than the association between the first consumer data attribute and the third consumer data attribute because the association between the first consumer data attribute and the second consumer data occurred more frequently.

As another example, if a first consumer data attribute has been included in the same digital device interaction and/or non-digital device interaction as a second consumer data attribute N number of times with the most recent interaction occurring at time $T_0$ and the first consumer data attribute has been included in the same digital device interaction and/or non-digital device interaction as a third consumer data attribute N number of times with the most recent interaction occurring at time $T_1$, where $T_1$ occurs more recently than $T_0$, then the association between the first consumer data attribute and the third consumer data attribute will have a higher confidence score than the association between the first consumer data attribute and the second consumer data attribute because the association between the first consumer data attribute and the third consumer data attribute occurred more recently.

The confidential level may be based on the particular type of customer data attribute. For example, some customer data attributes have a higher confidence level than others, such as recent census data, or new credit card address data may have a higher confidential level than, for example, mail-order data.

Figure 4:
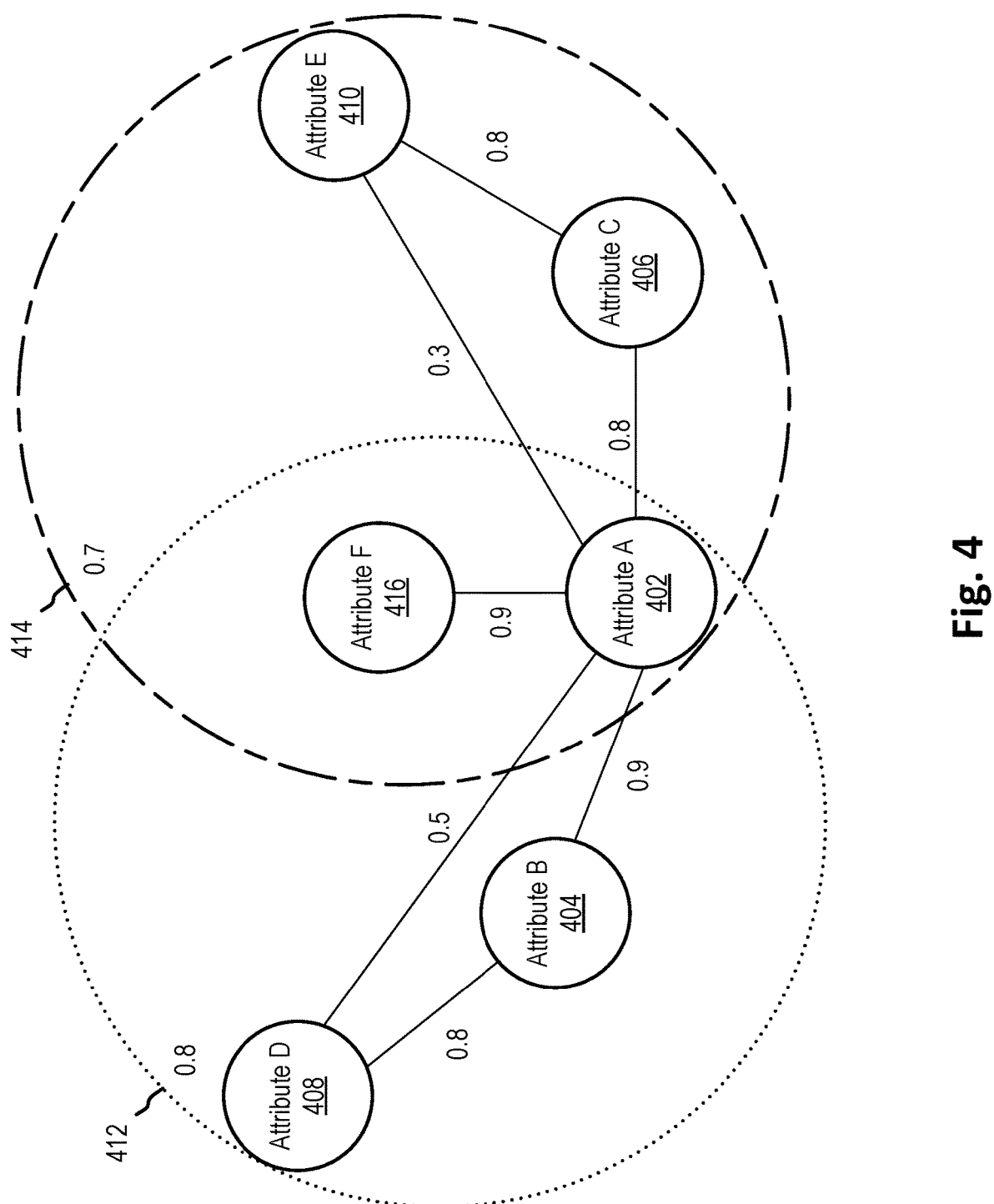
FIG. 4 is an example diagram of associations between attributes, in accordance with certain aspects of the present disclosure.

Referring to FIG. 4, an example diagram of associations between attributes is illustrated, in accordance with certain aspects of the present disclosure. This diagram is merely an example, which should not unduly limit the scope of the claims. One of ordinary skill in the art would recognize many variations, alternatives, and modifications.

As shown, Attribute A 402 is associated with Attribute B 404 and Attribute C 406. However, in certain examples, the association between Attribute A 402 and Attribute B 404 has a stronger association, i.e., 0.9 as opposed to 0.8, because Attribute A 402 may have been included in more interactions with Attribute B 404 than with Attribute C 406 and/or the interaction(s) including Attribute A 402 and Attribute B 404 may have occurred more recently than the interaction(s) including Attribute A 402 and Attribute C 406.

In certain embodiments, the confidence score for an association between two attributes may also be based on associations with other attributes. For example, assume Attributes B and D 404, 408 are associated with each other and assume Attributes C and E 406, 410 are associated with each other. In this example, because Attributes B and D 404, 408 are associated with each other and the association between Attributes A and B 402, 404 has a higher confidence level than the confidence level for the association between Attributes A and C 402, 406, the method 300 may include assigning a higher confidence level to an association between Attributes A and D (i.e., 0.5) as compared to the confidence level for the association between Attributes A and E 402, 410 (i.e., 0.3).

As another example, assume Attributes B and D 404, 408 are associated with each other and assume Attributes C and E 406 are associated with each other. Moreover, assume an association having a confidence score of 0.5 links Attributes D and A 408, 402 and an association having a confidence score of 0.3 links Attributes E and A 410, 402. In this example, the method 300 may increase the confidence score for the association between Attributes A and B 402, 404 as compared to the confidence score for the association between Attributes A and C 402, 406 due to the association between Attributes B and D 404, 408 and the higher confidence score of 0.5 between Attributes D and A 408, 402 as compared to the confidence score of 0.3 between Attributes A and E 402, 410.

In certain embodiments, the method 300 further includes creating combinations of consumer data attributes and associations (block 308) and assigning a combination score to the combinations (block 310). Because there can be hundreds or thousands of different associations for a single consumer, the combinations can be in the hundreds of thousands of combinations, if not millions. For example, if there are twenty-five attributes and associations and the method 300 creates different combinations having twelve of those attributes and associations, the number of combinations exceeds a million different potential combinations.

In certain embodiments, the combination score assigned to the combination is based on the frequency that the combined attributes are included in the same digital device interaction and/or non-digital device interaction. Additionally, or alternatively, the combination score assigned to the combination may be based on the recency that the combined attributes are included in the same digital device interaction and/or non-digital device interaction. Additionally, or alternatively, the combination score assigned to the combination may be based on a set of rules and/or machine learning.

For example, referring again to FIG. 4, the combination 412 of Attributes A, B, and D 402, 404, 408 is assigned a combination score of 0.8 and the combination 414 of Attributes A, C, and E 402, 406, 410 is assigned a combination score of 0.7. In certain instances, the combination 412 of Attributes A, B, and D 402, 404, 408 may be assigned a higher score than the combination 414 of Attributes A, C, and E 402, 406, 410 due to the combination 412 of Attributes A, B, and D 402, 404, 408 occurring in interactions more frequently and/or more recently than the combination 414 of Attributes A, C, and E 402, 406, 410.

Additionally, or alternatively, the combination 412 of Attributes A, B, and D 402, 404, 408 may have been assigned a higher combination score due to a set of rules. In certain examples, the set of rules may be based on conventional norms for a particular locale. For example, assume Attributes D and E 408, 410 are two last names associated with Attribute A 402, which may be the first name of a person, physical location, device identifier, etc. Further assume Attribute F 416 is an age associated with Attribute A 402. In this example, a rule may be set to determine whether the age (i.e., Attribute 416) of the person associated with Attribute A 402 is an age where it is customary for the person associated with Attribute A 402 to be married, which could explain why two last names are associated with Attribute A 402. If the person is too young to be married, the combination including the last name having the higher frequency may be provided a higher combination score. In comparison, if the person is at an age where it is typical to be married according to conventional norms for a particular locale, the combination having the last name included in a more recent interaction may be provided a higher combination score. However, this is only an example and not meant to be limiting. Furthermore, other rules based on conventional norms for a particular local may be incorporated into method 300 for assigning a combination score to a combination.

Additionally, or alternatively, the combination 412 of Attributes A, B, and D 402, 404, 408 may have been assigned a higher combination score due to machine learning. In certain examples, the machine-learning algorithm may use feature engineering and model generation to determine combination scores associated with different combinations of attributes.

Additionally, or alternatively, the machine-learning algorithm may be trained using a labelled data set. In certain examples, the machine-learning algorithm may also be retrained (e.g., by having weights adjusted) after removing one or more of the attributes. For example, assume a high combination score is assigned to the combination of Attributes A, B, and D 402, 404, 408. Then, to further refine the machine-learning algorithm, Attribute B 404 may be removed from the combination 412 and the machine-learning algorithm may assign a combination score to Attributes A and D 402, 408. If the machine-learning algorithm does not assign a high enough combination score to Attributes A and D 402, 408, then the machine-learning algorithm may be retrained to increase the combination score for Attributes A and D 402, 408.

In certain embodiments, the method 300 also includes matching combinations with other combinations based at least in part on the combination scores (block 312). In doing so, attributes (e.g., Attributes 402-410, 416) that are not included in an interaction can be associated with one another. For example, assume a device identifier has not been associated with a physical address in any interactions. By (i) creating combinations of various attributes associated with the device identifier and combinations of various attributes associated with a physical address, (ii) assigning combination levels to the combinations, and (iii) matching Attributes A, B, C were not included in the same interaction as Attributes D, E, F and, therefore, not associated with Attributes D, E, F. However, due to the matching of Combination A and Combination B, Attributes A, B, C, D, E, F are all associated with one another. Due to the association, an improvement over conventional embodiments is provided by including more information (i.e., Attributes A, B, C, D, E, F) about a consumer to a potential marketer than if only Attributes A, B, C or only Attributes D, E, F were associated with a consumer.

TABLE A

| | Combination A | | | Combination B | |
| Attribute A | Attribute B | Attribute C | Attribute D | Attribute E | Attribute F |
| --- | --- | --- | --- | --- | --- | the combinations to one another based on the combination levels, the device identifier can be associated with a physical address. For example, referring to FIG. 5, a diagram including combination matches is illustrated, in accordance with certain aspects of the present disclosure. This diagram is merely an example, which should not unduly limit the scope of the claims. One of ordinary skill in the art would recognize many variations, alternatives, and modifications.

Figure 5:
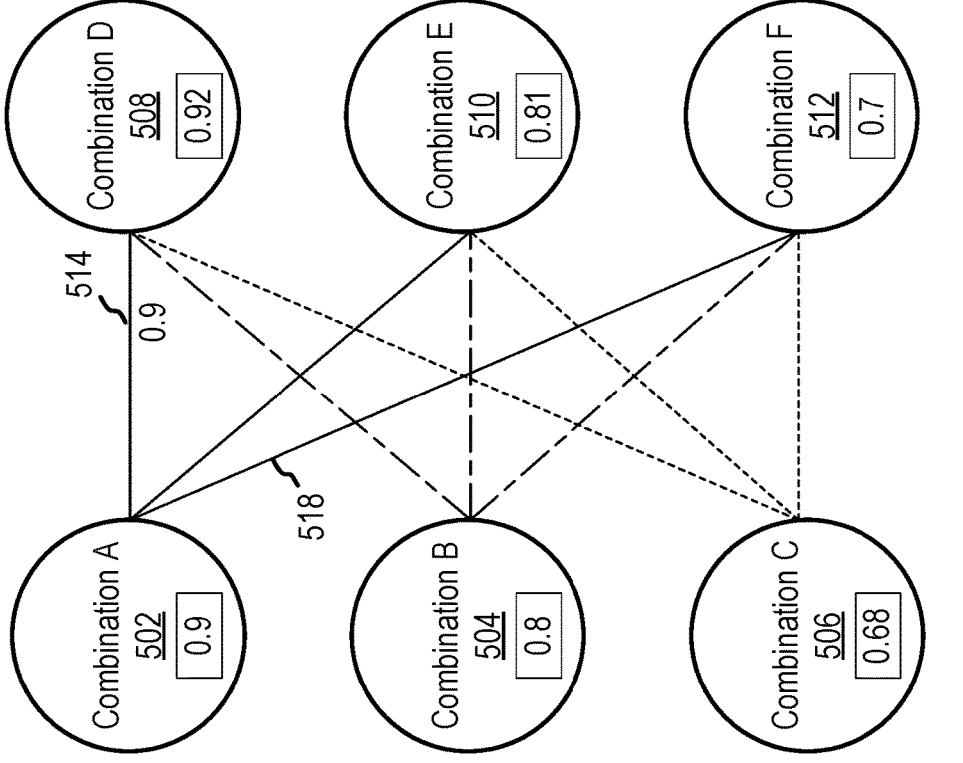
FIG. 5 is a diagram including combination matches, in accordance with certain aspects of the present disclosure.

As illustrated in FIG. 5, there are six combinations, each assigned a different combination score. Specifically, Combination A 502 is assigned a combination score of 0.9, Combination B 504 is assigned a combination score of 0.8, Combination C 506 is assigned a combination score of 0.68, Combination D 508 is assigned a combination score of 0.92, Combination E 510 is assigned a combination score of 0.81, and Combination F 512 is assigned a combination score of 0.7. In certain instances, each of the combinations 502-512 are matched to one another based on the combination scores. In some examples, the matches are based on the combinations having the highest scores. For example, because the combination score of 0.9 of Combination A 502 and the combination score 0.92 of Combination D 508 are the two highest, the method 300 can include matching Combination A 502 to Combination D 508. In certain other examples, each of the combinations 502-512 are matched to one another based on the combinations having a similar score. For example, because the combination score of 0.8 of Combination B 504 is most similar to combination score 0.81 of Combination E 510, the method 300 can include matching Combination B 504 to Combination E 510.

In certain embodiments, the method 300 includes assigning a matching score to each of the matches (block 314). In some examples, the matching score is based on the combination scores for the combinations that are matched to one another. For example, because both Combination A 502 and Combination D 508 have high combination scores and/or similar combination scores, the method 300 can assign a high matching score (e.g., matching score 514 of 0.9) to the match between Combinations A and D 502, 508. Additionally, or alternatively, the matching scores are determined using a machine-learning algorithm.

According to some embodiments, the method 300 includes associating the attributes included in the combinations based on the matches (block 316). Below is an example table (i.e., Table A) of associated attributes based on the matches. As illustrated, Combination A 502 includes Attributes A, B, C and Combination B 504 includes Attributes D, E, F. Prior to matching Combination A to Combination B, According to certain embodiments, the method 300 includes creating an identity graph (block 318). In certain instances, the identity graph is based at least in part upon (i) the associations between consumer data attributes, (ii) the combinations of consumer data attributes, and/or (iii) the matching of the combinations.

Figure 6:
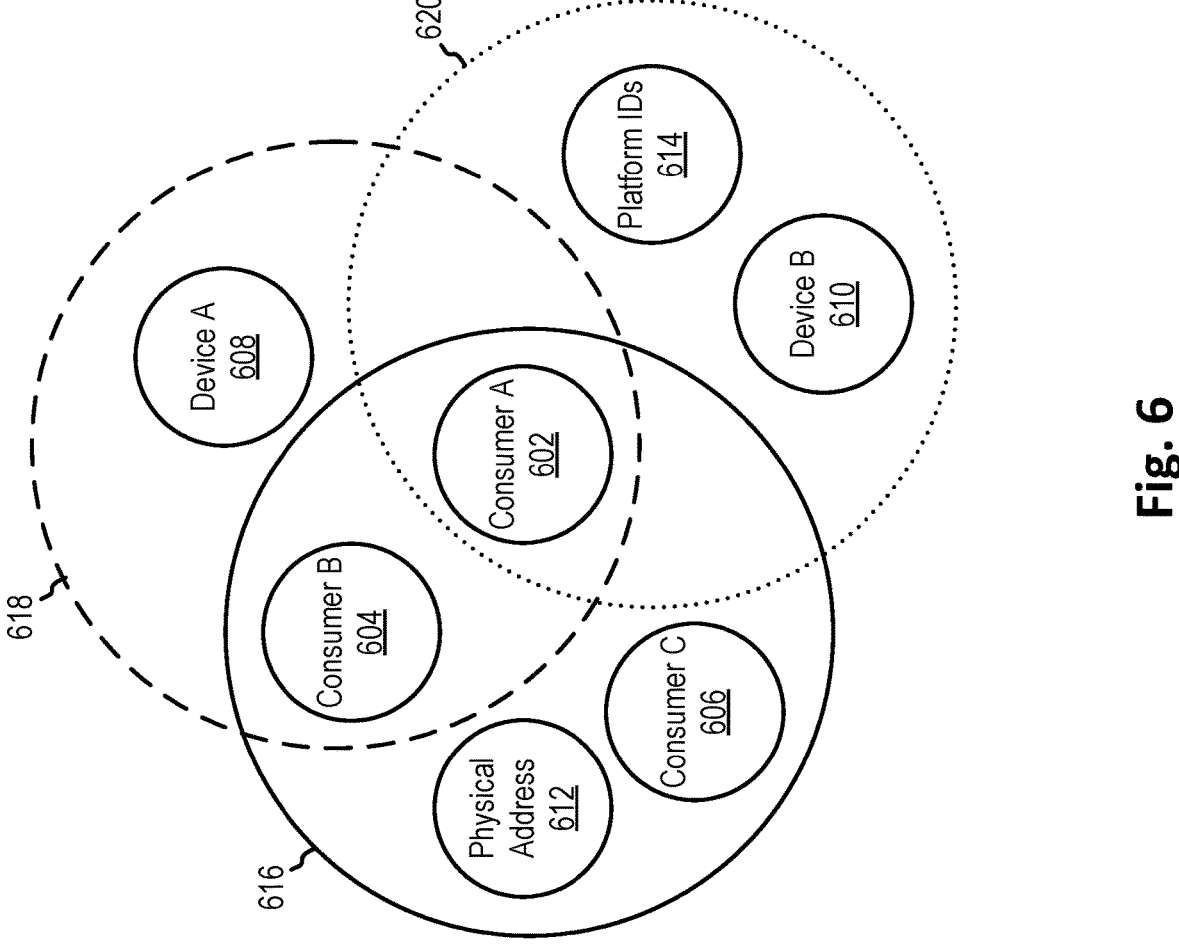
FIG. 6 is an example of an identity graph, in accordance with certain aspects of the present disclosure.

FIG. 6 is an example of an identity graph 600, in accordance with certain aspects of the present disclosure. This diagram is merely an example, which should not unduly limit the scope of the claims. One of ordinary skill in the art would recognize many variations, alternatives, and modifications.

As illustrated, the identity graph 600 can include a plurality of attributes 602-614. In the illustrated embodiments, the identity graph 600 includes a plurality of consumers (i.e., Consumer A 602, Consumer B 604, and Consumer C 606), a plurality of devices (i.e., Device A 608 and Device B 610), a Physical Address 612, and an attribute corresponding to Platform IDs 614, which may be associated with and/or include a plurality of sub-attributes (e.g., cookies, mobile advertising ids (MAIDs), email hashes, etc.).

In certain instances, the method 300 groups the attributes 602-614 based on a hierarchical structure. For example, in at least one example, the method 300 groups the Consumers A, B, and C 602, 604, 606 together because they are part of the same household and share the same Physical Address 612, as indicated by the grouping 616. As another example, the method 300 groups the Consumers A, B, and C 602, 604, 606 if they are related to one another.

Additionally, or alternatively, the method 300 groups the attributes 602-614 based on one or more associations between the attributes 602-614. For example, in certain instances, Device A 608 may have been used by both Consumer A 602 and Consumer B 604 during an interaction, but Consumer C 606 has not used Device A 608 during an interaction and, therefore, the method 300 groups Device A 608 with Consumers A and B 602, 604 into a grouping 618 but not Consumer C 606. As another example, Device B 610 and Platform IDs 614 may have only been used by Consumer A 602 during an interaction and, therefore, the method 300 groups Device B 610 and Platform IDs 614 with Consumer A 602 into a grouping 620 but not Consumers B and C 604, 606.

Due to this identity graph 600 and the groupings included therewith, a user (e.g., a marketer) can better understand the relationships between different attributes 602-614.

According to certain embodiments, the method 300 includes creating a user interface allowing a user to crosswalk between different groupings included in the identity graph 600 (block 320). For example, assume a marketer has previously successfully advertised to Consumer C 606. Due to the marketer having previously successfully advertised to Consumer C 606, the marketer may also like to advertise to other consumers associated with Consumer C 606. As such, the marketer may be able to cross-walk between the associations of Consumer C 606. For example, via the grouping 616, the marketer can determine who else lives with Consumer C 606. In this example, the marketer can determine Consumers A and B 602, 604 live with Consumer C 606. Moreover, the marketer can determine whether marketing to Consumers A and/or B 602, 604 might be successful by reviewing information associated with the device attributes of Consumers A and B 402, 404 (i.e., Device A 608 for Consumers A, B 602, 604 and Device B 610 for Consumer A 602). Based on this review, the marketer can determine whether advertising to Consumers A and/or B 602, 604 is likely to be successful.

In certain examples, the creation of the identity graph 600 may be performed by an identity graph component 214 of the unified matching engine 202. Additionally, or alternatively, the repository API 216 is configured to receive data from the collection component 208, the matching component 212, and/or the identity-graph component 214, and store the received data in the repository 218. In some examples, the repository API 216 is configured to allow users to interact with data and documents stored in the repository 218. For example, the repository API 216 may allow a user to interact with the identity graph 600 illustrated in FIG. 6 via, for example, a user interface.

Figure 7:
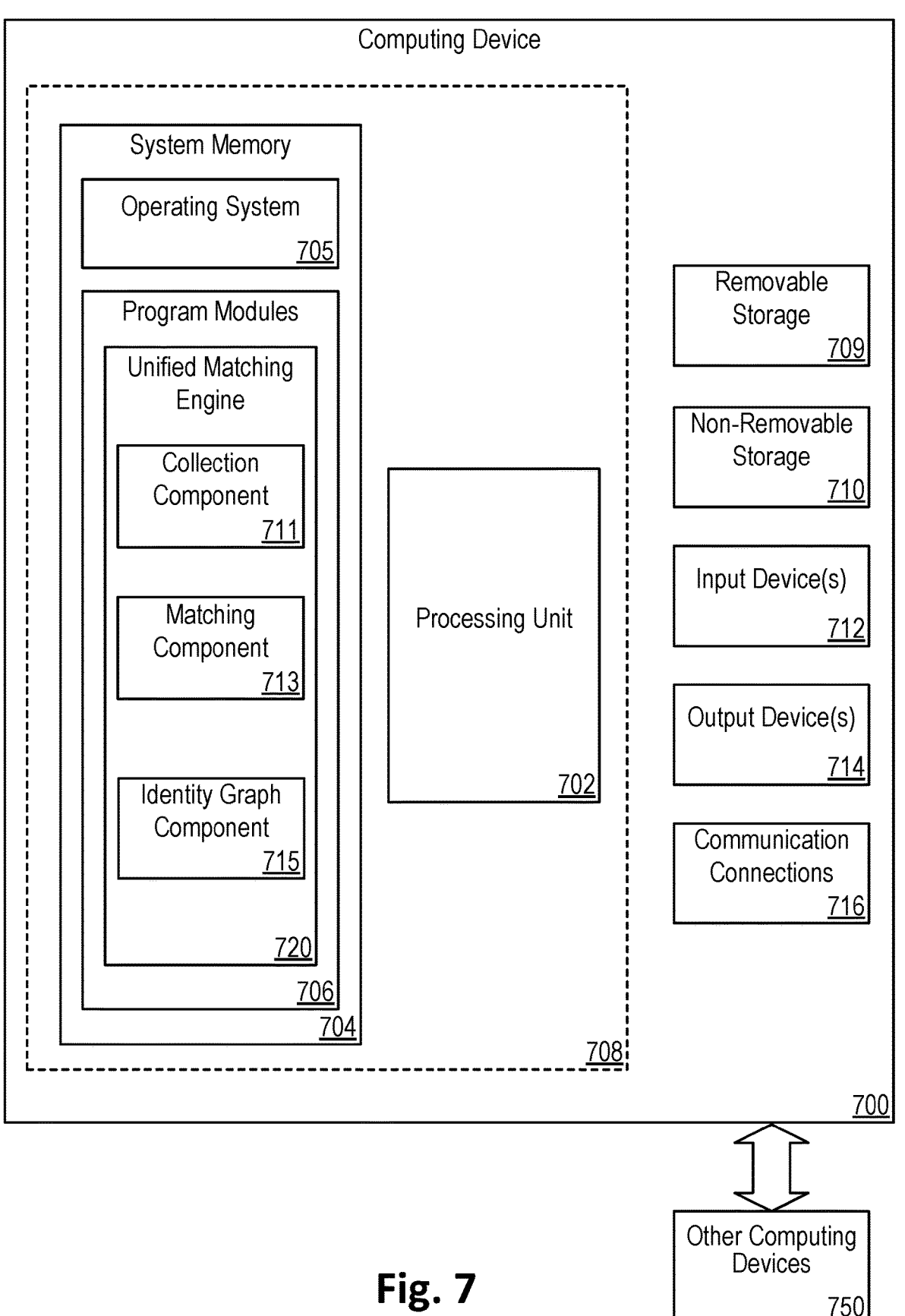
FIG. 7 is a block diagram illustrating physical components (e.g., hardware) of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a unified matching engine 720 (e.g., unified matching engine 202), including computer executable instructions for a unified matching engine model 720 that can be executed to implement the methods disclosed herein (e.g., method 300). In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running the unified matching engine 720, such as one or more components with regard to FIG. 2 and, in particular, a collection component 711 (e.g., collection component 208), a matching component 713 (e.g., matching component 212), and/or an identity-graph component 715 (e.g., the identity-graph component 214).

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, memory sticks, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., corresponding to unified matching engine 720) may perform processes including, but not limited to, the aspects, as described herein. Other program modules that may be used in accordance with aspects of the present disclosure, and in particular for implementing uniform matching, may include a collection component 711, a matching component 713, and/or an identity-graph component 715, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as visual image sensors, audio sensors, a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
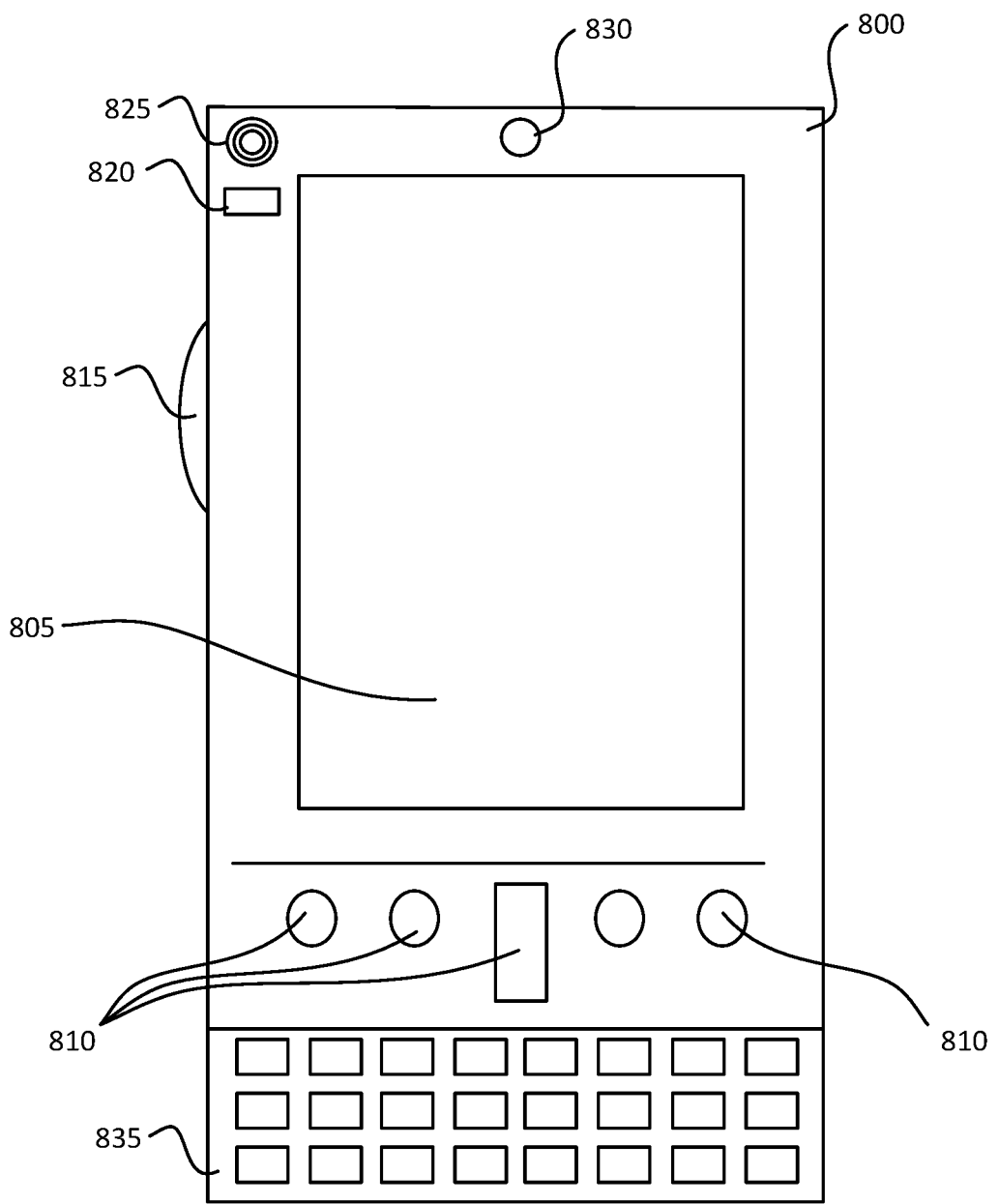
FIG. 8A is a simplified diagram of a mobile computing device with which aspects of the present disclosure may be practiced.
Figure 8B:
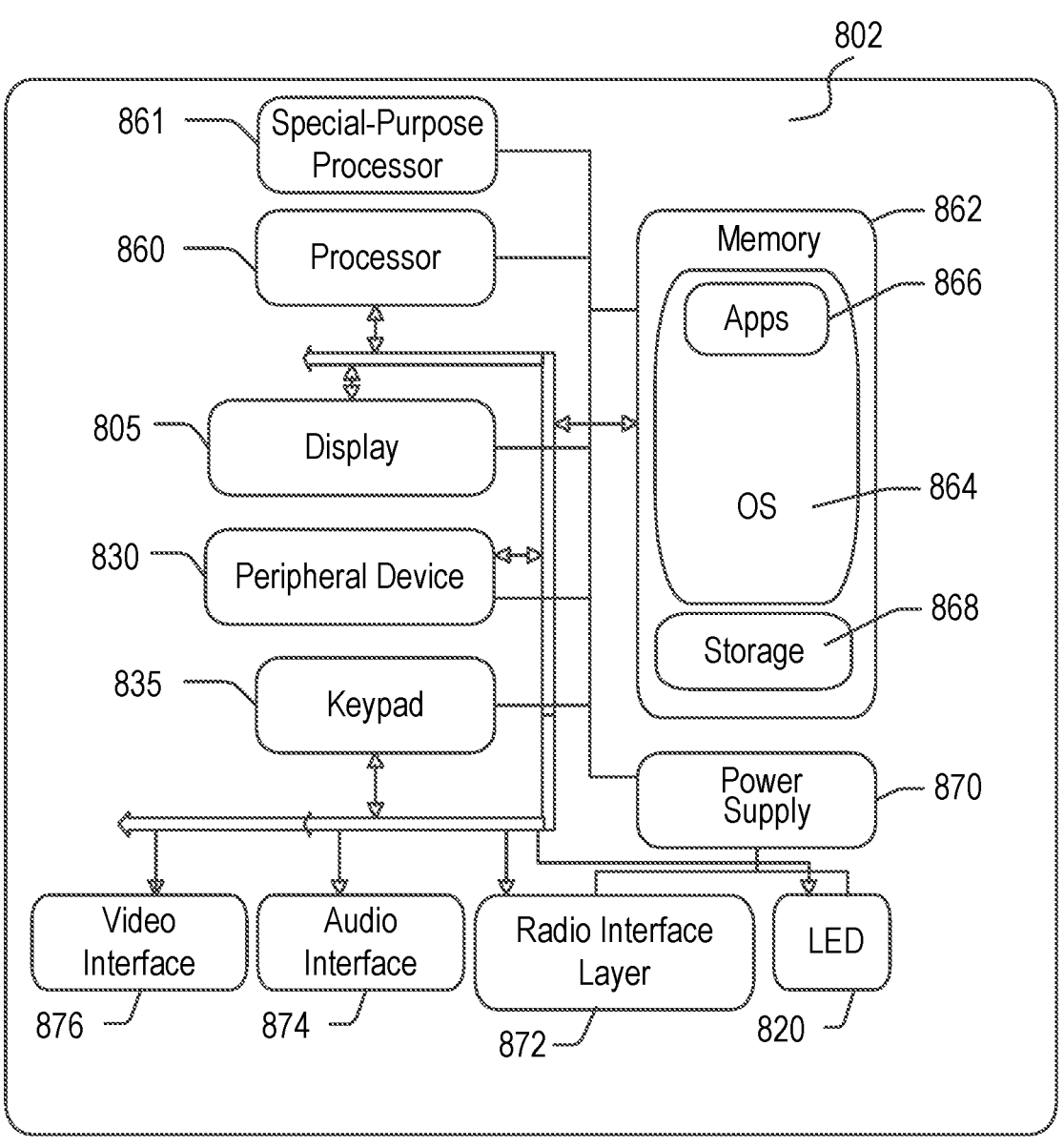
FIG. 8B is another simplified block diagram of a mobile computing device with which aspects of the present disclosure may be practiced.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced and/or accessed (e.g., a marketer may access and/or interact with the identity-graph 600 via the mobile computing device 800).

With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device 800. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a unified matching engine as described herein (e.g., collection component, matching component, and/or identity-graph component, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like. Audio interface 874, video interface 876, and keyboard 835 may be operated to receive input (e.g., a verbal cue or a textual cue, as described herein).

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Additionally, or alternatively, the computing device 700, the computing device 800 and/or one or more of their components can be used as and/or incorporated into one or more of the devices set forth in FIGS. 1 and 2, e.g., the electronic device 102 and/or the one or more databases 104. In some embodiments, the functionality of the electronic device 102, the one or more databases 104, and/or the unified matching engine 720 can be implemented in a cloud environment. For example, the functionality of the electronic device 102, the one or more databases 104, and/or the unified matching engine 720 can be implemented in one or more computing devices 700 and/or computing devices 800 that are connected via a network (e.g., a local network and/or the internet).

As should be appreciated, FIGS. 8A and 8B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As used herein memory and other storage devices may be configured for storing data and/or computer-executable instructions defining and/or associated with a processor for carrying out some or all of the processing or system steps described herein, and the processor may retrieve and execute those instructions as contemplated herein. The memory may represent one or more hardware memory devices accessible by processor. An example of memory can include, but is not limited to, a type of memory usable by a computer, such as random access memory (RAM), read only memory (ROM), tapes, magnetic discs, optical discs, volatile memory, non-volatile memory, and any combination thereof. The memory may include a main memory, preferably random access memory (RAM), and may also include a secondary memory. The secondary memory may include, for example, a hard disk drive and/or a removable storage drive, such as a floppy disk drive, a magnetic tape drive, an optical disk drive, flash drive, cloud storage, etc., and includes a computer usable storage medium having stored therein computer software and/or data.

The computer processes herein may be described in terms of various processing steps. Such processing steps may be realized by any number of hardware and/or software components that perform the specified functions. Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. Unless otherwise stated, the words "mechanism" and "element" are used broadly and are not limited to mechanical or physical embodiments, but can include software routines in conjunction with processors, etc.

The computer programs (also referred to as computer control logic, programming logic, or programming) are stored in the memory. Computer programs may also be received via a communications interface. Such computer programs, when executed, enable the computer system to perform various features in accordance with aspects of the present disclosure, as discussed herein. In particular, the computer programs, when executed, enable the processor to perform such features. Accordingly, such computer programs represent controllers of the computer.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail.

Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A computer-implemented method for implementing a uniform matching engine, comprising:

receiving consumer data from a plurality of data sources, including digital device interactions from a plurality of digital devices, the consumer data comprising a plurality of attributes that include personally identified information, non-personally identifiable information, or a combination thereof;

associating a first attribute of the plurality of attributes with a second attribute of the plurality of attributes;

assigning a confidence score to the association of the first attribute with the second attribute, using a same digital device interaction, wherein the same digital device interaction comprises respective digital device interactions by a same digital device from the plurality of digital devices and same user of the same digital device, based on one or more of: (i) how frequently the first attribute and the second attribute have been included in the same digital device interaction, where the more frequent the inclusion the greater the confidence score, (ii) how recently the first attribute and the second attribute have been included in the same digital device interaction, where the more recent the inclusion the greater the confidence score, (iii) whether the first attribute and the second attribute are of a particular type, and (iv) the association of the first attribute and the second attribute each with other attributes;

creating a plurality of combinations of attributes of the plurality of attributes based upon respective associations;

assigning a combination score to each combination of the plurality of combinations of attributes based on one or more of: (i) how frequently the combination of attributes have been included in the same digital device interaction, where the more frequent the inclusion the greater the combination score, (ii) how recently the combination of attributes have been included in the same digital device interaction, where the more recent the inclusion the greater the combination score, (iii) whether the combination of attributes are of a particular type, and (iv) a set of rules selected based at least one of the attributes;

adjusting, for respective combinations of attributes of the plurality of combinations of attributes, an initial combination score for a first combination of attributes by (i) removing an attribute from the first combination of attributes to form a subcombination, (ii) calculating a combination score for the subcombination, and (iii) adjusting the combination score for the subcombination based on the initial combination score;

matching a set of combinations from the plurality of combinations of attributes based on the combination score and the confidence score of the plurality of combinations of attributes to associate different attributes of the set of combinations, wherein the set of combinations includes a first combination of the plurality of combinations of attributes to a second combination of the plurality of combinations of attributes;

associating one or more attributes included in the first combination with one or more attributes included in the second combination based upon the matching;

using an identity graph component to generate an identity graph of association of the one or more attributes included in the first combination with the one or more attributes included in the second combination; and providing an interface to permit a user to select sets of output data using the identity graph.

2. The method of claim 1, further comprising assigning a matching score to the set of combinations based on the combination score of the first combination and the second combination.

3. The method of claim 1, wherein the plurality of data sources comprise at least one data source selected from the following data sources: public records, public censuses, property data, realty data, telecom data, purchase propensity data, content publisher data, e-commerce data, supply-side publisher data, mobile application data, customers data sets, clickstream data, and/or digital metadata.

4. The method of claim 1, wherein the identity graph is based at least in part upon (i) the association of the first attribute with the second attribute, (ii) the plurality of combinations, (iii) the matching of the first combination to the second combination, (iv) the association of the one or more attributes included in the first combination with the one or more attributes included in the second combination, or a combination thereof.

5. The method of claim 1, wherein the first attribute and the second attribute are selected for use in the identity graph are based on at least one of (i) a hierarchical structure, (ii) a relationship between the first attribute and the second attribute, (iii) a physical geographical address, and (iv) a common digital device.

6. The method of claim 1, wherein the plurality of data sources comprise data from digital device interactions, including data regarding digital identity data, device identifiers, attribute data, browser and app-level data, location data, and/or online behavioral data.

7. The method of claim 6, wherein digital device interaction data is obtained from one or more of the following: content & e-commerce publishers; supply-side platform aggregators; mobile application SDKs or aggregators; customer provided data; clickstream data aggregators; device metadata.

8. The method of claim 1, wherein the plurality of data sources include data from one or more digital device interactions, and wherein the step of associating a first attribute of the plurality of attributes with a second attribute of the plurality of attributes involves the step of determining if the first attribute and the second attribute were obtained from data from the same digital device interactions and, if so, associating the first attribute and the second attribute.

9. The method of claim 1, creating a plurality of combinations of attributes of the plurality of attributes based upon the respective associations.

10. The method of claim 1, further comprising a step of adjusting a first combination score for the first combination of attributes using a machine learning algorithm, the machine learning algorithm using feature engineering and model generation to determine combination scores associated with different combinations of attributes.

11. The method of claim 1, wherein the step of the matching the first combination of the plurality of combinations of attributes to the second combination of the plurality of combinations of attributes is based at least in part on the combination score.

12. A computer-implemented method for implementing a uniform matching engine, comprising:

receiving an association of a first attribute of a plurality of attributes with a second attribute of the plurality of attributes, from digital device interactions from a plurality of digital devices, wherein the plurality of attributes comprises personally identified information, non-personally identifiable information, or a combination thereof;

assigning a confidence score to the association of the first attribute with the second attribute, using a same digital device interaction, wherein the same digital device interaction comprises respective digital device interactions by a same digital device from the plurality of digital devices and same user of the same digital device, based on one or more of: (i) how frequently the first attribute and the second attribute have been included in the same digital device interaction, where the more frequent the inclusion the greater the confidence score, (ii) how recently the first attribute and the second attribute have been included in the same digital device interaction, where the more recent the inclusion the greater the confidence score, (iii) whether the first attribute and the second attribute are of a particular type, and (iv) the association of the first attribute and the second attribute each with other attributes;

receiving an association of one or more attributes included in a first combination of a plurality of combinations with one or more attributes included in a second combination of a plurality of combinations of attributes, wherein the plurality of combinations combines at least a portion of the plurality of attributes into different combinations, each combination of the plurality of combinations of attributes is assigned a combination score based on one or more of: (i) how frequently the combination of attributes have been included in the same digital device interaction, where the more frequent the inclusion the greater the combination score, (ii) how recently the combination of attributes have been included in the same digital device interaction, where the more recent the inclusion the greater the combination score, (iii) whether the combination of attributes are of a particular type, and (iv) a set of rules selected based at least one of the attributes;

adjusting, for respective combinations of attributes of the plurality of combinations of attributes, an initial combination score for a first combination of attributes by (i) removing an attribute from the first combination of attributes to form a subcombination, (ii) calculating a combination score for the subcombination, and (iii) adjusting the combination score for the subcombination based on the initial combination score;

matching the first combination and the second combination among the plurality of combinations of attributes based on the combination score and the confidence score of the plurality of combinations;

generating an identity graph based at least in part upon (i) the association of the first attribute with the second attribute, (ii) the plurality of combinations, or a combination thereof; and providing an interface to permit a user to select sets of output data using the identity graph.

13. The method of claim 1, wherein the plurality of attributes excludes a predetermined type of a cookie.

14. The method of claim 13, wherein the predetermined type of the cookie comprises a third-party cookie.

15. The method of claim 1, wherein the identity graph indicates a first user and a second user sharing a physical address, and the first user at the physical address is as indicated in the associated one or more attributes of the first combination.

16. The method of claim 1, wherein the identity graph indicates a first user and a second user shaing a digital device to enable cross-walking from the first user to the second user, and the first user using the digital device is indicated as at least a part of the associated one or more attributes of the first combination.

* * * * *